US009481293B2

(12) United States Patent
Honma et al.

(10) Patent No.: US 9,481,293 B2
(45) Date of Patent: Nov. 1, 2016

(54) LED LIGHT

(75) Inventors: Shin'ichi Honma, Aachen (DE); Josef A. Schug, Wuerselen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 891 days.

(21) Appl. No.: 13/124,911

(22) PCT Filed: Oct. 13, 2009

(86) PCT No.: PCT/IB2009/054488
§ 371 (c)(1),
(2), (4) Date: Apr. 19, 2011

(87) PCT Pub. No.: WO2010/046806
PCT Pub. Date: Apr. 29, 2010

(65) Prior Publication Data
US 2011/0198999 A1    Aug. 18, 2011

(30) Foreign Application Priority Data
Oct. 20, 2008    (EP) ..................................... 08166998

(51) Int. Cl.
*B60Q 1/14* (2006.01)
*B60Q 1/12* (2006.01)
(Continued)

(52) U.S. Cl.
CPC . *B60Q 1/12* (2013.01); *B60Q 1/18* (2013.01); *H05B 33/083* (2013.01); *H05B 33/0845* (2013.01); *B60Q 2300/122* (2013.01); *B60Q 2300/142* (2013.01)

(58) Field of Classification Search
CPC .... B60Q 1/12; B60Q 1/18; B60Q 2300/122; B60Q 2300/142; H05B 33/083; H05B 33/0845
USPC .......... 315/77, 250, 294, 317, 320; 362/800, 362/545, 546, 465, 507, 523
See application file for complete search history.

(56) References Cited

U.S. PATENT DOCUMENTS 4,968,896 A    11/1990   Shibata et al.
5,101,326 A *  3/1992    Roney ........................... 362/545
(Continued)

FOREIGN PATENT DOCUMENTS

CN    1306923 A    8/2001
CN    1314982 A    9/2001
(Continued)

OTHER PUBLICATIONS

Decision of Rejection, China Application No. 200980141585.6, dated Apr. 14, 2014, 32 pages.
(Continued)

*Primary Examiner* — Daniel D Chang
(74) *Attorney, Agent, or Firm* — Patent Law Group LLP; Brian D. Ogonowsky

(57) ABSTRACT

It is provided a LED light (10) for a motor vehicle, comprising several LED fields (14), wherein each LED field (14) comprises at least one LED (L1, L2, L3, L4), a housing (34) for supporting the LED fields (14) and a circuit board (12) comprising a driving electronics for operating the LED fields (14), wherein the LED fields (14) are connected in series by the driving electronics and the driving electronics is adapted to switch on and off each LED field (14) according to its position in the series in dependence of a signal, wherein the circuit board (12) is connectable to an outside of the LED light (10) located current source (16) for applying an electrical current to the LED fields (14), and wherein the circuit board (12) is integrated into the housing (34). Since complicated and/or changing switching orders of the LED fields (14) are not intended the necessary circuit board (12) for providing the corresponding driving electronics may be so small that it may be integrated into the housing (34) of the LED light (10) without significantly increasing the building space. Particularly a lot of wires between a central control unit and the different LED fields (14) are omitted as well as the central control unit itself so that the LED light (10) only requires a small building space.

14 Claims, 3 Drawing Sheets

(51) Int. Cl.
*B60Q 1/18* (2006.01)
*H05B 33/08* (2006.01)

(56) References Cited

U.S. PATENT DOCUMENTS

| | | | |
|---|---|---|---|
| 5,765,940 | A | 6/1998 | Levy et al. |
| 6,239,716 | B1 | 5/2001 | Pross et al. |
| 2005/0018436 | A1 | 1/2005 | Leleve |
| 2008/0094000 | A1* | 4/2008 | Yamamoto et al. .......... 315/250 |

FOREIGN PATENT DOCUMENTS

| | | |
|---|---|---|
| DE | 102004055882 A1 | 1/2006 |
| DE | 102008008217 A1 | 8/2008 |
| EP | 1318701 A2 | 6/2003 |
| EP | 1906711 A1 | 4/2008 |
| JP | S61234496 A | 10/1986 |
| JP | 02-283539 | 11/1990 |
| JP | 04-001674 | 1/1992 |
| JP | 2008059811 | 3/2008 |
| JP | 2008074327 A | 4/2008 |
| WO | 2008038984 A1 | 4/2008 |
| WO | WO 2010141721 A2 * | 12/2010 |

OTHER PUBLICATIONS

EPO as ISA, PCTIB2009/054488 filed Oct. 13, 2009, "International Search Report and Written Opinion" mailed Jan. 29, 2010, 13 pages.
Notice of Reexamination, China Application No. 200980141585.6, dated Feb. 17, 2015, 17 pages.
Office Action, EP Application No. 09743918.6, dated Jan. 30, 2015, 5 pages.
Office Action, Japan Application No. 2011-531615, dated Dec. 8, 2015, 6 pages.
Office Action, Japan Application No. 2011-531615, dated Aug. 11, 2015, 14 pages.
Second Office Action, China Application No. 200980141585.6, dated Oct. 24, 2013, 26 pages.

* cited by examiner

LED LIGHT

FIELD OF THE INVENTION

The invention relates to the field of LED lights, which may be used as lights for a motor vehicle, particularly as bending light.

BACKGROUND OF THE INVENTION

From DE 10 2004 055 882 A1 a LED light in the form of a bending light for a motor vehicle is known, wherein the bending light comprises several light emitting diodes (LEDs). In dependence of a signal, which can be given by a driving situation, for instance steering angle of a steering wheel, speed of the vehicle or other condition of the car, one or more LEDs are switched on or off one by one for illuminating a curve of a road, when a driver of the motor vehicle wants to take the curve. Each LED is connected by wires to a central control unit, which comprises a driving electronics for operating the LEDs of the bending light, so that each LED is independently from the other LEDs separately turned on or off.

From U.S. Pat. No. 6,239,716 B1 a LED light for a motor vehicle is known, wherein a plurality of LEDs is connected in series. Each light emitting diode (LED) of this series is bridged by a switch, which provides a short current in the event of a failure of the bridged LED, so that the other LEDs may continue to operate. The LEDs are operated by a central control unit.

It is a disadvantage of these kinds of a LED light, that a large building space is required. Further a lot of wires are necessary to operate the plurality of LEDs leading to high manufacturing and assembling cost.

SUMMARY OF THE INVENTION

It is an object of the invention to provide a LED light for a motor vehicle, which requires a small building space.

This object is achieved by a LED light for a motor vehicle, comprising several LED fields, wherein each LED field comprises at least one LED, a housing for supporting the LED fields and a circuit board comprising a driving electronics for operating the LED fields, wherein the LED fields are connected in series by the driving electronics and the driving electronics is adapted to switch on and off each LED field according to its position in the series in dependence of a signal, wherein the circuit board is connectable to an outside of the LED light located current source for applying an electrical current to the LED fields, and wherein the circuit board is integrated into the housing.

When the LED light should be used as bending light, flashing indicator light or the like, the different LED fields always have to be switched on and off one by one, wherein the LED field may consist of a single LED or may comprise two or more LEDs. It is used the insight that due to this specific intended control of the different LED fields a significantly simplified circuit can be used so that a central control unit may be omitted. Since complicated and/or changing switching orders of the LED fields are not intended the necessary circuit board for providing the corresponding driving electronics may be so small that it may be integrated into the housing of the LED light without significantly increasing the building space. Particularly a lot of wires between a central control unit and the different LED fields are omitted as well as the central control unit itself so that the LED light only requires a small building space. Due to the decentralized control it is only necessary to apply a current source and the signal, wherein additional wires are saved. Due to the reduced wiring the manufacturing and assembling costs are reduced. Since the current source, which needs a comparably high building space in comparison to the driving electronics, is arranged outside the LED light, the building space of the LED light is not significantly affected by the integration of the circuit board into the housing. In dependence of the amount of the applied signal from outside the LED light, wherein the signal corresponds for instance to a steering angle of a steering wheel or a activation of a turn signal, one LED field after the other is turned on or turned off in dependence on the signal, which is given by the driving situation, for instance the steering angle of a steering wheel or the curving of a street. For instance the LED fields are turned on one after the other at an increasing steering angle and turned off at a decreasing steering angle. Depending on the amount of the signal more or less LED fields may be operated at the same time, wherein the LED fields are switched on or off corresponding to its position in the series. Particularly it is possible to fully or partially bridge a LED field and/or to connect a LED field to ground in dependence of the signal without the need of a complicated wiring.

Particularly to each LED field a transistor is allocated for switching fully or partially on and off the allocated LED field. By means of a simple integrated circuit the transistor may change its status in dependence of the signal.

Preferably each transistor is connected to the signal via a comparator, wherein each comparator is adapted to compare the signal with a different threshold, wherein the amount of the threshold corresponds to the position of the specific LED field in the series. The different thresholds may be applied to one of the inputs of the corresponding comparator by applying a constant voltage like 12 V via a particular number of resistors, whereby the number of applying resistors corresponds to the position of the corresponding LED field in the series. Particularly one voltage line comprising several equal or different resistors is sufficient for providing the different thresholds for the comparator, when after the specific resistor a connection line is led to the input of the comparator. The other input of the comparator is connected to a signal line comprising the signal.

In a preferred embodiment each transistor is connected to its allocated LED field such, that for switching fully or partially off the allocated LED field the allocated LED field is fully or partially bridged. A particular LED field may be switched off by a short current bypassing the LED field and/or a particular LED field may by partially switched on or off by bypassing a certain amount of the applied current via the allocated transistor. A resistor leading to a loss of power is not necessary. Depending on the amount of the signal a particular LED field may be switched fully or partially on or off.

In a further embodiment each transistor is connected to its allocated LED field such, that for switching fully or partially off the allocated LED field an input of the allocated LED field is fully or partially connected to ground. The current for operating a specific LED field may be directed in parallel to the LED field to ground. A resistor leading to a loss of power is not necessary. Depending on the amount of the signal a particular LED field may be switched fully or partially on or off.

Particularly the driving electronics is adapted to transform the signal, which is fed into the driving electronics in the form of a PWM signal, into an analogous signal, particularly a ramp signal, by means of an integrator circuit. In automotive applications it is sometimes easier to provide a signal by means of pulse width modulation (PWM). By means of the integrator a PWM signal with high duty cycle may be trans-formed into a high voltage signal and a PWM signal with low duty cycle into a low voltage signal. Due to the integrator a ramp signal can by applied, which is easier to handle by means the simplified driving electronics.

Preferably the driving electronics comprises at the maximum four connector lines for being connected to a wire leading outside the LED light. The four connector lines may by connected to one current line for connecting a current source to the LED fields, one signal line comprising the signal, one voltage line for providing a constant voltage for the comparators and one collector line for closing the electric circuit. For example only four lines are sufficient for operating a bending light of a motor vehicle. Since a complicated wiring is avoided, the manufacturing and assembling costs are reduced.

In a preferred embodiment the housing is at least two-part and comprises a supporting member for receiving the LED fields and a cover for embedding the circuit board into the housing, particularly between the cover and the supporting member. The circuit board may be clamped into the housing, so that the circuit board is protected in a building space efficient manner. For instance only a plug or socket of the circuit board is accessible from outside the housing. Further the cover may apply a holding force to the circuit board leading to good electrical contact between the circuit board and the LED fields.

Particularly the housing comprises a maximum area A perpendicular to a main lighting direction of the LED fields of $6\ cm^2 \leq A \leq 30\ cm^2$, particularly $8\ cm^2 \leq A \leq 25\ cm^2$ and preferably $9\ cm^2 \leq A \leq 15\ cm^2$. An area of $5 \times 5\ cm^2$ or $4 \times 4\ cm^2$ or $3 \times 3\ cm^2$ is sufficient for receiving a sufficient number of LED fields as well as the circuit board comprising the driving electronics. The housing particularly comprises a thickness d mainly perpendicular to the area A of $0.5\ cm \leq d \leq 3.0\ cm$, preferably $0.8\ cm \leq d \leq 2.0\ cm$ and most preferred $1.0\ cm \leq d \leq 1.5\ cm$.

Preferably the circuit board comprises the LED fields. The LED fields may be connected to the circuit board by a printing technique, by means of which the LED fields are fastened to the circuit board. Further the LED fields may by clamped into corresponding recesses and/or held by means of spring loaded holding arms or the like. Particularly all LED fields are connected to a common substrate which is fastened to the circuit board. Since the LED fields may be preassembled to the circuit board, the LEDs as well as its driving electronics may be assembled by one common assembling unit.

In a preferred embodiment at least one LED field comprises two or more LEDs, wherein the LEDs are connected with each other in the same manner like the LED fields. The LEDs of a single LED field may be connected to each other as described above with reference to the LED fields. Particularly the same kind of wiring may be used for the LEDs of a single LED field as used for the different LED fields. Thus, the LED field itself may comprise transistors, comparators and so on for switching on and off the LEDs. The light intensity of each LED field may be adjusted at will particularly in dependence of the signal applied to the LED field. This leads to a higher resolution of the light intensity in dependence of the signal. Particularly when a particular LED field should be switched partially on or off for providing an intended light intensity, preferably each transistor of the LED field is adapted to compare the signal with a different reference signal, wherein the amount of the reference signal corresponds to the position of the specific LED in the series.

The invention further relates to a bending light for a motor vehicle comprising a LED light, which may be designed as previously described, wherein the signal corresponds to a driving situation of the motor vehicle. Particularly the driving situation is given by a steering angle of a steering wheel, activation of a turn signal and/or the curving of a street. Since complicated and/or changing switching orders of the LED fields are not intended the necessary circuit board for providing the corresponding driving electronics may be so small that it may be integrated into the housing of the LED light without significantly increasing the building space. Particularly a lot of wires between a central control unit and the different LED fields are omitted as well as the central control unit itself so that the LED light only requires a small building space. One signal line is sufficient besides a return line for controlling the bending light in dependence of the steering wheel angle signal from the steering wheel.

The invention further relates to a motor vehicle comprising a bending light, which may be designed as previously described, a steering wheel and/or a turn indicator activator and a sensor for detecting a steering angle of the steering wheel and/or an activation of the turn indicator activator, wherein the sensor provides a signal in dependence of a driving situation, particularly the steering angle and/or the of the turn indicator activator, and the signal is applied to the bending light and/or a turn indicator.

Since complicated and/or changing switching orders of the LED fields are not intended the necessary circuit board for providing the corresponding driving electronics may be so small that it may be integrated into the housing of the LED light without significantly increasing the building space. Particularly a lot of wires between a central control unit and the different LED fields are omitted as well as the central control unit itself so that the LED light only requires a small building space. One signal line is sufficient besides a return line for controlling the bending light in dependence of the steering wheel angle of the steering wheel.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
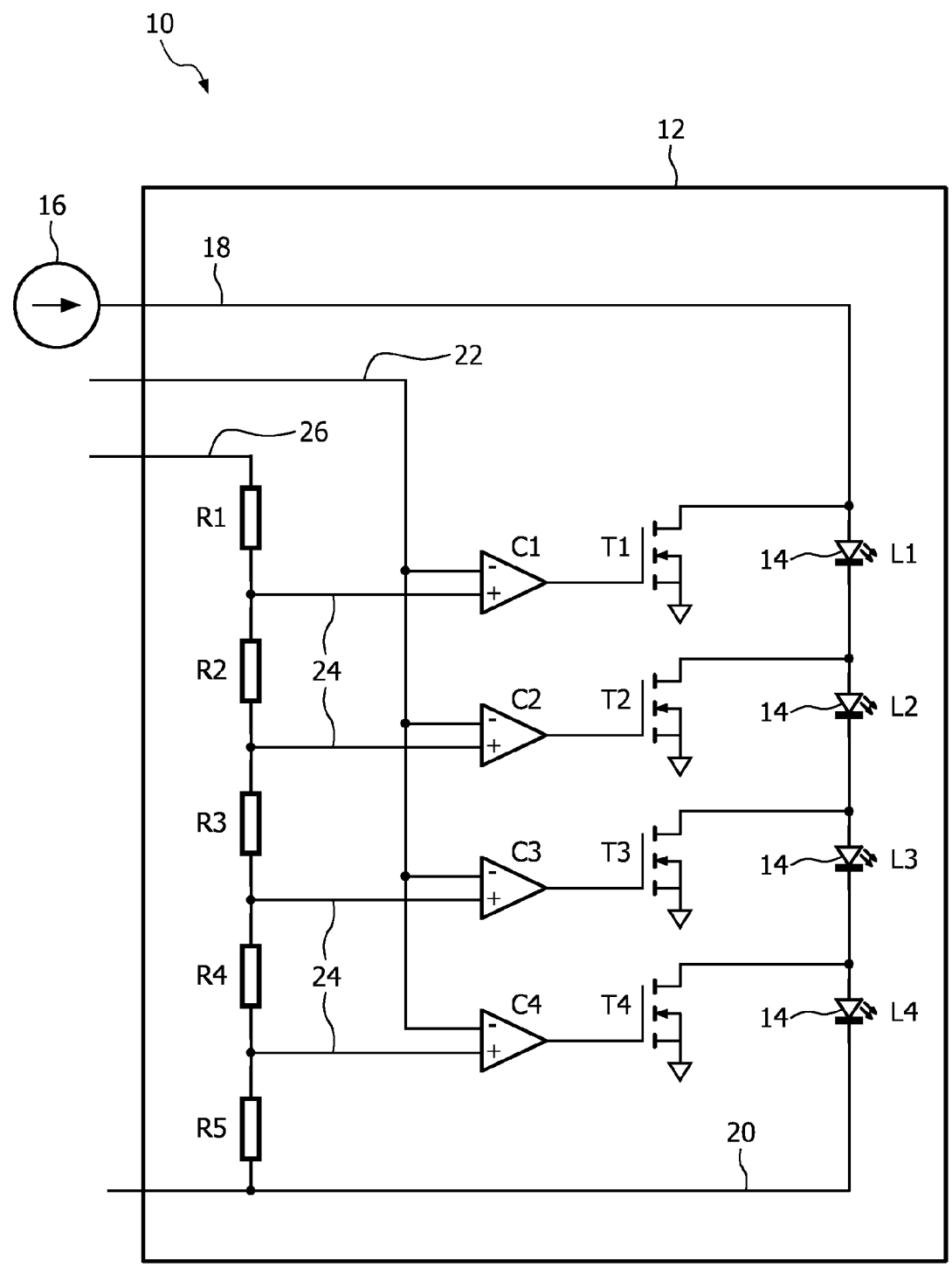
FIG. 1 is schematic circuit diagram of the LED light according to the invention.

The LED light 10 as illustrated in FIG. 1 comprises a circuit board 12 to which in the illustrated embodiment four LED fields 14 each comprising one light emitting diode (LED) L1, L2, L3, L4 are fastened. The LED light 10 may comprise more or less LED fields 14. The LED fields 14 may comprise two or more LEDs, wherein for sake of clarity only one LED is illustrated. To the LEDs L1, L2, L3, L4 is a current source 16 applied. The current source 16 is located outside the LED light 10 and connected to the LEDs L1, L2, L3, L4 via a current line 18. Since the current source 16 is not part of the LED light 10, the building space of the LED light 10 is comparatively low. For closing the electrical circuit a collector line 20 comprising 0 V is provided. The LED fields 14 are connected in series and are adapted to be switched on or off one by one according to its position in the series.

For operating the LED fields 14 a signal in form of a signal voltage for instance between 0 V and 12 V is applied via a signal line 22. Each LED filed 14 is connected to the signal voltage via a comparator C1, C2, C3, C4, where the signal voltage is compared to a specific reference, for instance a predefined threshold. The specific reference is provided via a + input of the comparator via a connector line 24, which is connected to a voltage line 26 such that between the entrance of the voltage line 26 and each comparator C1, C2, C3, C4 a different number of resistors R1, R2, R3, R4, R5 is arranged. The voltage line applies a constant voltage of for instance 12 V, so that to each + input of each comparator C1, C2, C3, C4 a different voltage is applied to be compared with the signal voltage. The reference of each comparator C1, C2, C3, C4 can be adjusted by means of the applied voltage of the voltage line 26 and/or by means of the amount of the specific resistor R1, R2, R3, R4, R5. The signal line 22 is connected to the—input of each comparator C1, C2, C3, C4. In the illustrated embodiment the signal line 22 is resistor-free and comprises no resistor.

Each comparator C1, C2, C3, C4 is connected to a corresponding transistor T1, T2, T3, T4. In dependence whether the signal voltage of the signal line 22 is higher or lower than the reference of a particular the comparator C1, C2, C3, C4 the output of the comparator C1, C2, C3, C4 changes and the corresponding transistor T1, T2, T3, T4 switches the corresponding LED field 14 on or off. For switching its corresponding LED field 14 off the transistor T1, T2, T3, T4 may connect the input of the corresponding LED field 14 to ground. For switching its corresponding LED field 14 on the transistor T1, T2, T3, T4 may disconnect the connection between the input of the corresponding LED field 14 and ground, so that the current of the current line 18 is forced to flow through the corresponding LED L1, L2, L3, L4. For example the following switching statuses of the LED fields 14 may be provided in dependence of a signal voltage between 0 V and 12 V:

| signal voltage [V] | L1 | L2 | L3 | L4 |
| --- | --- | --- | --- | --- |
| 0 | on | on | on | on |
| >2.4 | on | on | on | off |
| >4.8 | on | on | off | off |
| >7.2 | on | off | off | off |
| >9.6 | off | off | off | off |

Figure 2:
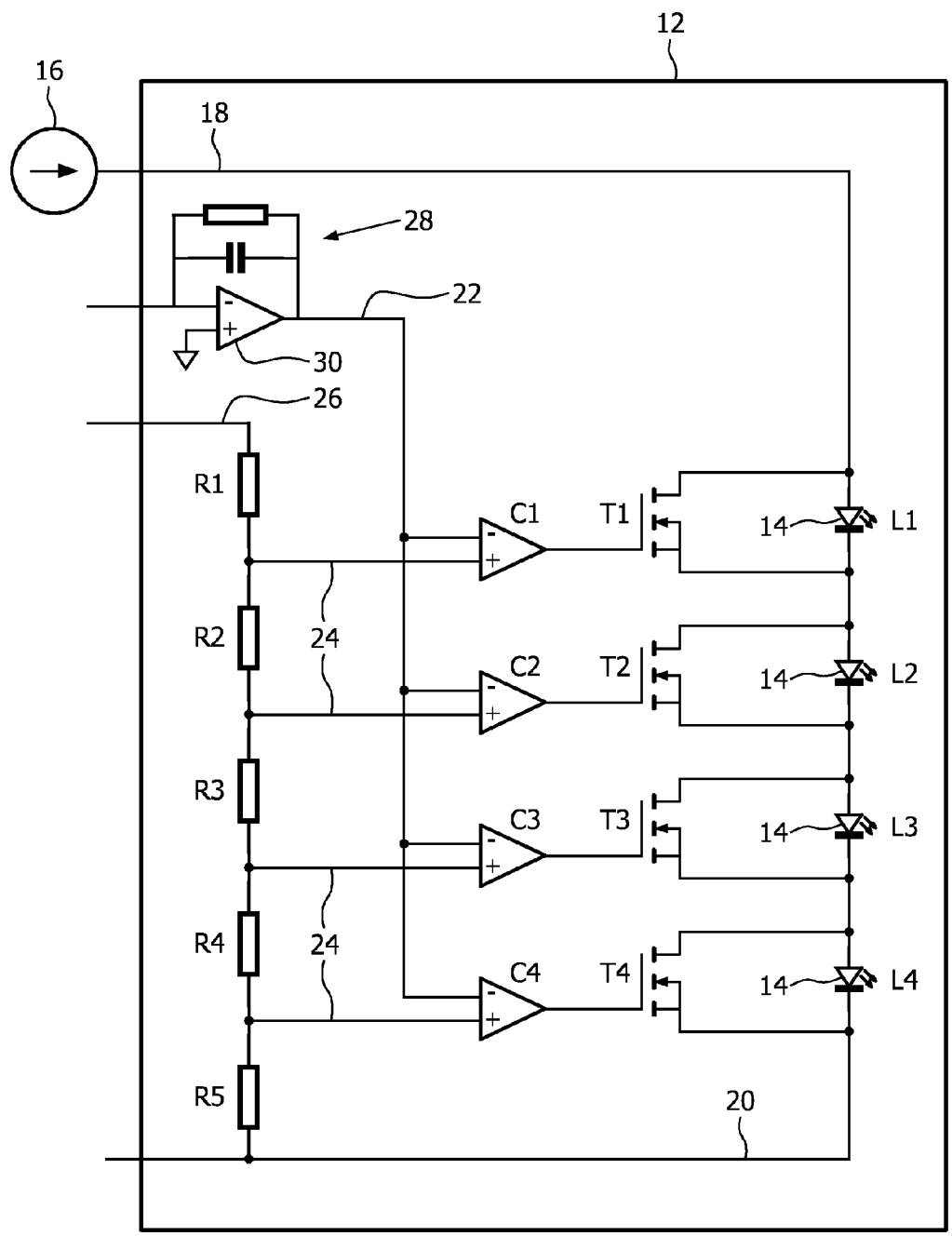
FIG. 2 is schematic circuit diagram of the LED light according to a further embodiment of the invention in and FIG. 3 is schematic perspective view of a bending light comprising the LED light of FIG. 1 or FIG. 2.

As illustrated in FIG. 2 the transistors T1, T2, T3, T4 of the LED light 10 may bridge its corresponding LED field 14 for switching the corresponding LED field 14 off. A short current bypassing the corresponding LED field 14 may be provided via the corresponding transistor T1, T2, T3, T4. For switching its corresponding LED field 14 on a connection between the input of the corresponding LED field and the output of the corresponding LED field may be disconnected by means of the corresponding transistor T1, T2, T3, T4, so that the current of the current line 18 is forced to flow through the corresponding LED L1, L2, L3, L4. For example the following switching statuses of the LED fields 14 may be provided in dependence of a signal voltage between 0 V and 12 V:

| signal voltage [V] | L1 | L2 | L3 | L4 |
| --- | --- | --- | --- | --- |
| 0 | off | off | off | off |
| >2.4 | off | off | off | on |
| >4.8 | off | off | on | on |
| >7.2 | off | on | on | on |
| >9.6 | on | on | on | on |

In the in FIG. 2 illustrated embodiment the signal voltage, which corresponds for instance to a steering wheel angle of a steering wheel of a motor vehicle, is applied as PWM signal and transformed into a ramp signal by means of a transform circuit 28 comprising an integrator 30. In the alternate the illustrated transform circuit 28 may be omitted and/or provided on the circuit board 12 of the LED light 10 illustrated in FIG. 1.

Figure 3:
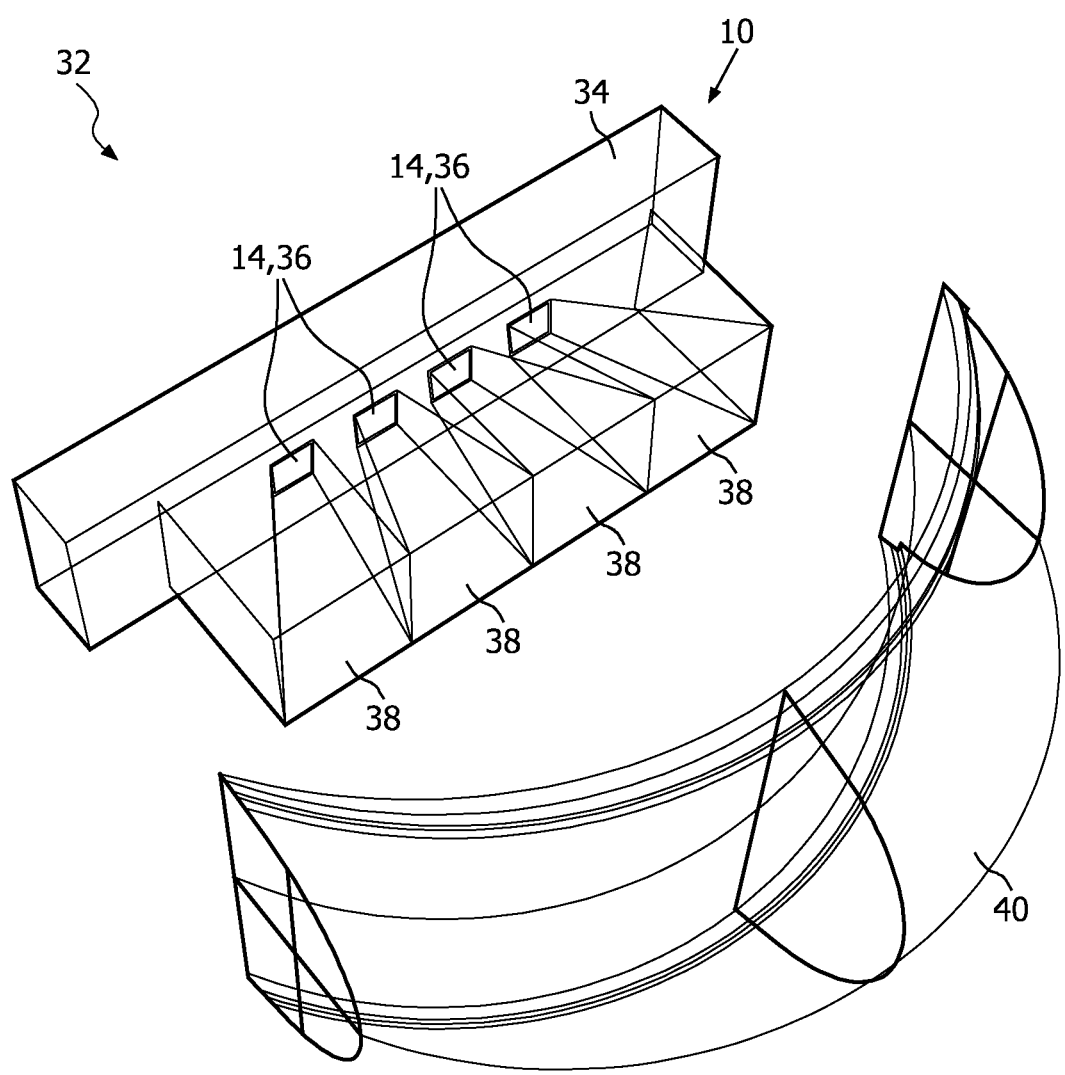

As illustrated in FIG. 3 a bending light 32 comprising the LED light 10 as illustrated in FIG. 1 or FIG. 2 may be provided. The LED light 10 comprises a housing 34, into which the circuit board 12 with the driving electronics is integrated. The housing 34 is preferably two-part for clamping the circuit board 12 between two parts of the housing 34. The housing 34 comprises openings 36 for receiving the LED fields 14. To each opening 36 and its corresponding LED field 14 a collimator 38 for providing a defined bright/dark-cutoff is provided. The bending light 32 comprises a bended half-cylindrical lens 40 for guiding the light emitted by the LED fields 14. For switching the LED fields 14 of the bending light 32 on or off one by one a signal voltage corresponding to a steering wheel angle of a steering wheel may be applied to the LED light 10 of the bending light 32. The current source 16 for operating the LED fields 14 may be positioned at a distance to the LED light 10 and the bending light 32. For instance the LED light 10 and/or the bending light 32 may be positioned on the outside of a car body of a motor vehicle, wherein the current source 16 may be positioned in an engine compartment of the motor vehicle.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the signal voltage of the signal line 22 is inverted and/or the + input and the—input of the comparators C1, C2, C3, C4 are exchanged. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:
1. An LED light for a motor vehicle, comprising:
a plurality of LED fields, wherein each LED field comprises at least one LED, wherein the LED fields are connected in series, the different LED fields being spaced apart so that a relative position of an illuminated LED field is perceptible by a human being;

a housing for supporting the LED fields;

a circuit board comprising driving electronics for operating the LED fields, the circuit board being configured to apply an electrical current to the LED fields;

the driving electronics comprising:
- a plurality of comparators, where each comparator is associated with a different LED field, wherein an output of each comparator is configured to turn its associated LED field on and off depending on input signals into the associated comparator;
- a threshold voltage generator for each comparator, wherein a different threshold voltage is applied to a first input of each of the comparators;
- a variable signal being commonly applied to a second input of all the comparators;
- wherein a number of the LED fields illuminated and positions of the LED fields illuminated at any time, under control of the output of the comparators, is perceptible by the human being;
- a plurality of collimators in the housing, the plurality of collimators comprising a separate collimator associated with each of the LED fields that causes the light from illuminated LED fields to be directed to separate areas, where the different areas illuminated are perceptible by the human being; and
- wherein the particular number of LED fields illuminated at any one time and a particular position of the LED fields illuminated produce a perceptible light field that conveys a particular control by a driver of the motor vehicle.

2. The LED light according to claim 1, wherein to each LED field a transistor is allocated for switching at least partially on and off the allocated LED field.

3. The LED light according to claim 2, wherein each transistor is connected to be controlled by an associated one of the comparators.

4. The LED light according to claim 2, wherein each transistor is connected to its allocated LED field such that for at least partially switching off the allocated LED field the allocated LED field is at least partially bridged.

5. The LED light according to claim 2, wherein each transistor is connected to its allocated LED field such that for switching at least partially off the allocated LED field an input of the allocated LED field is at least partially connected to ground.

6. The LED light according to claim 1, wherein the driving electronics is adapted to transform a PWM signal into an analog signal by means of an integrator circuit.

7. The LED light according to claim 1, wherein the driving electronics comprises, at a maximum, four connector lines for being connected to a wire leading outside the LED light.

8. The LED light according to claim 1, wherein the housing is at least two-part and comprises a supporting member for receiving the LED fields and a cover for embedding the circuit board into the housing.

9. The LED light according to claim 1, wherein the housing comprises a maximum area A perpendicular to a main lighting direction of the LED fields of 6 cm$^2$≤A≤30 cm$^2$, particularly 8 cm$^2$≤A≤25 cm$^2$ and preferably 9 cm$^2$≤A≤15 cm$^2$.

10. The LED light according to claim 1, wherein the circuit board comprises the LED fields.

11. The LED light according to claim 1, wherein at least one LED field comprises two or more LEDs, wherein the LEDs are connected with each other in the same manner like the LED fields.

12. The LED light of claim 1, wherein the housing is bent such that light emitted by different LED fields is emitted in different directions relative to the motor vehicle.

13. The LED light of claim 12 wherein the number of LED fields illuminated and a position of the LED fields illuminated are controlled by turning a steering wheel of the vehicle.

14. The LED light of claim 12 wherein the number of LED fields illuminated and a position of the LED fields illuminated are controlled by a turning direction signal activator of the vehicle.

* * * * *